A. McKENZIE.
VOTING MACHINE.
APPLICATION FILED FEB. 12, 1900.
1,066,514.
Patented July 8, 1913.
13 SHEETS—SHEET 2.
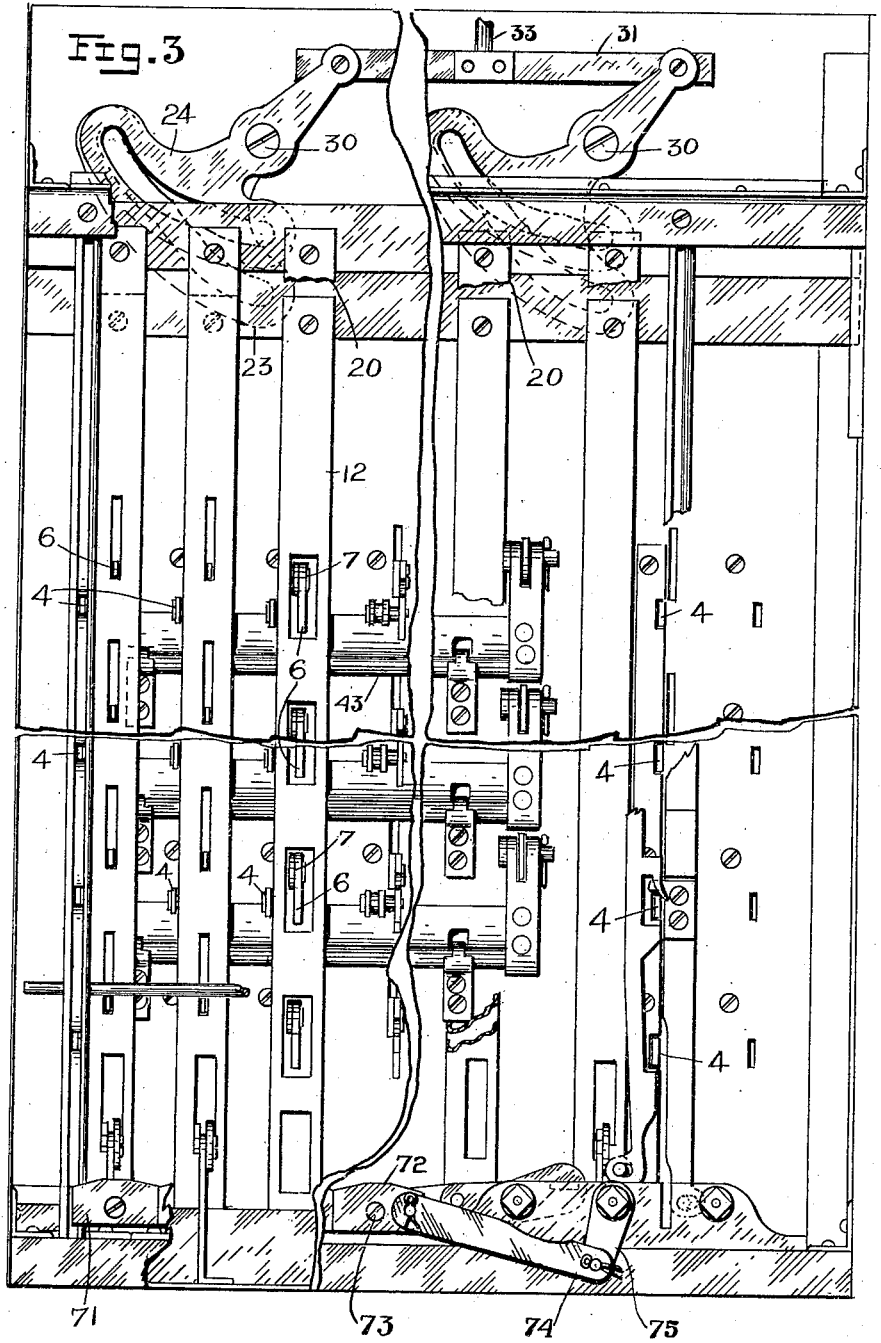

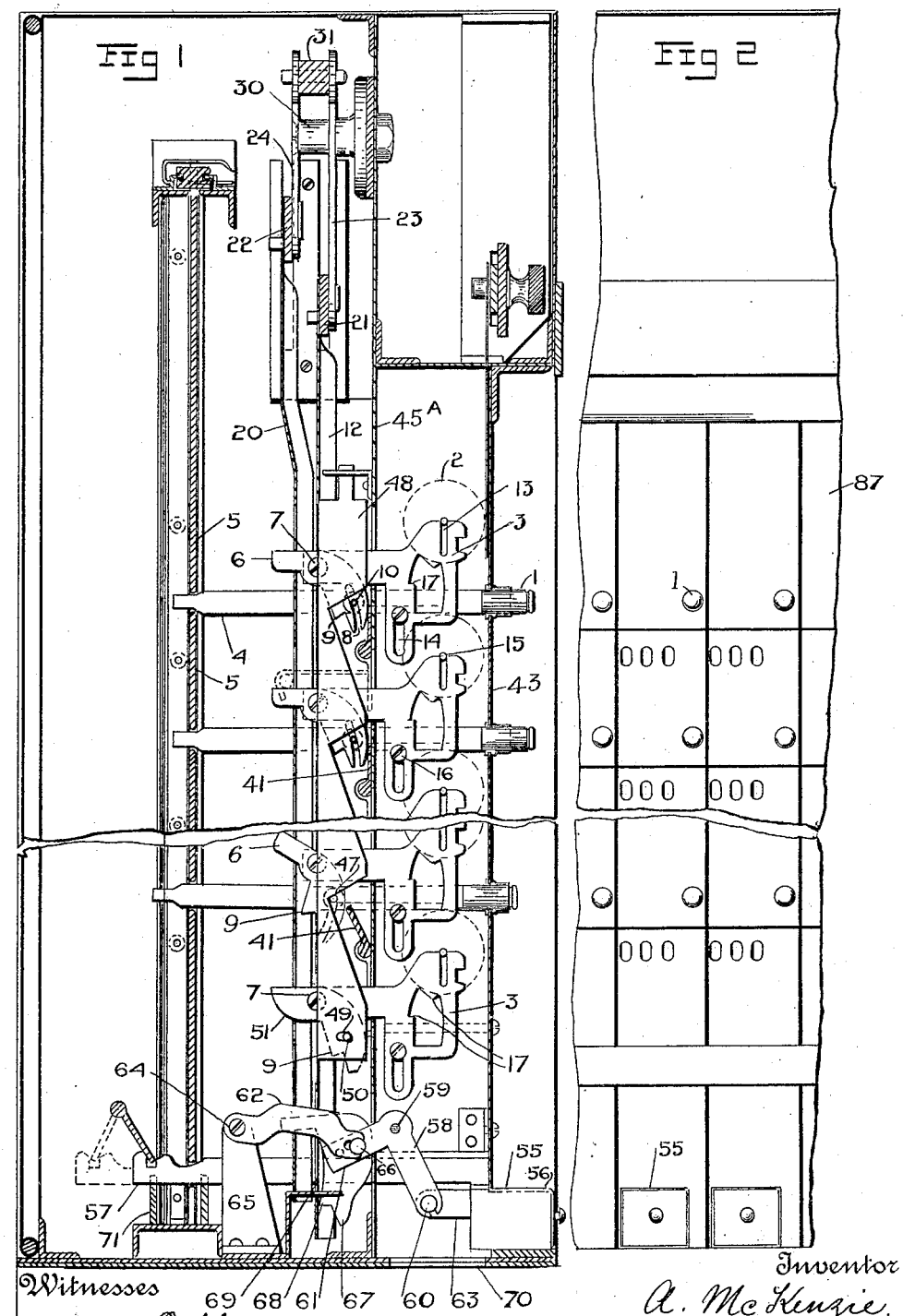

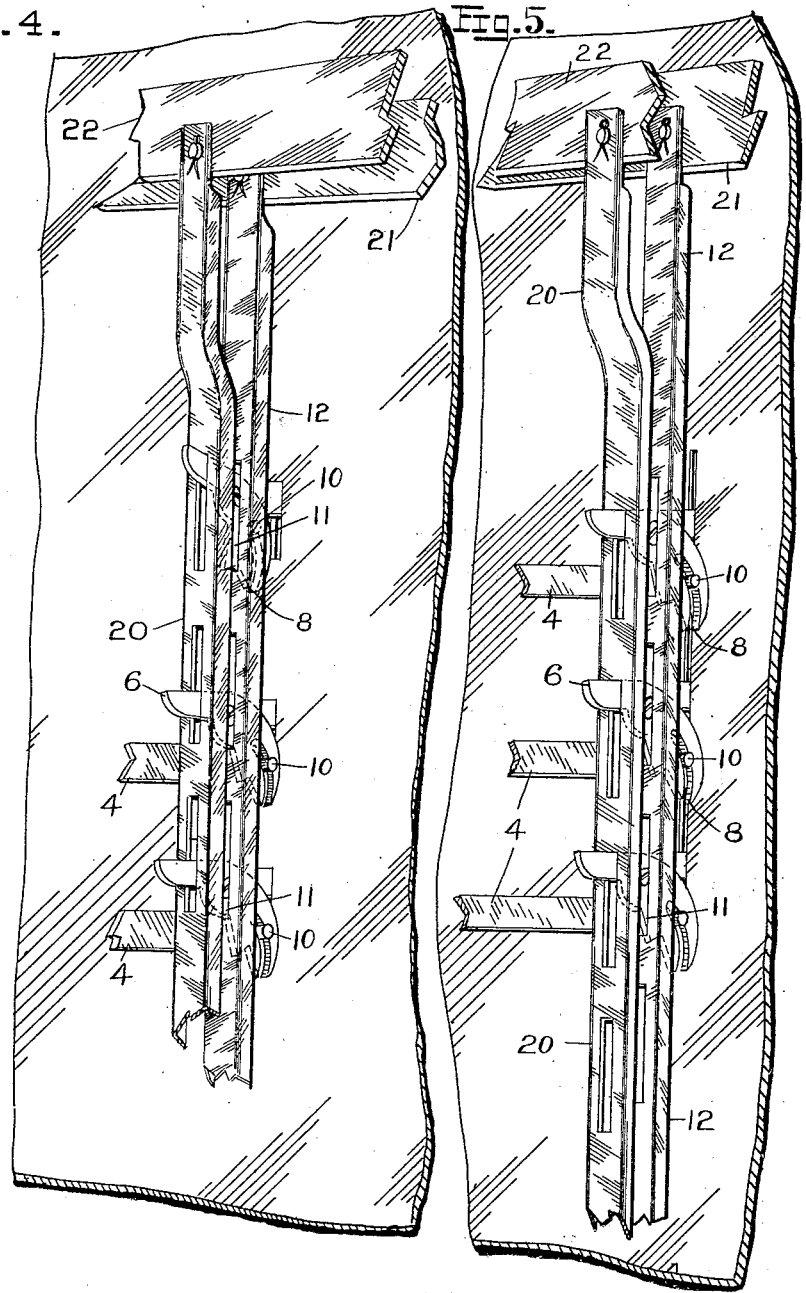

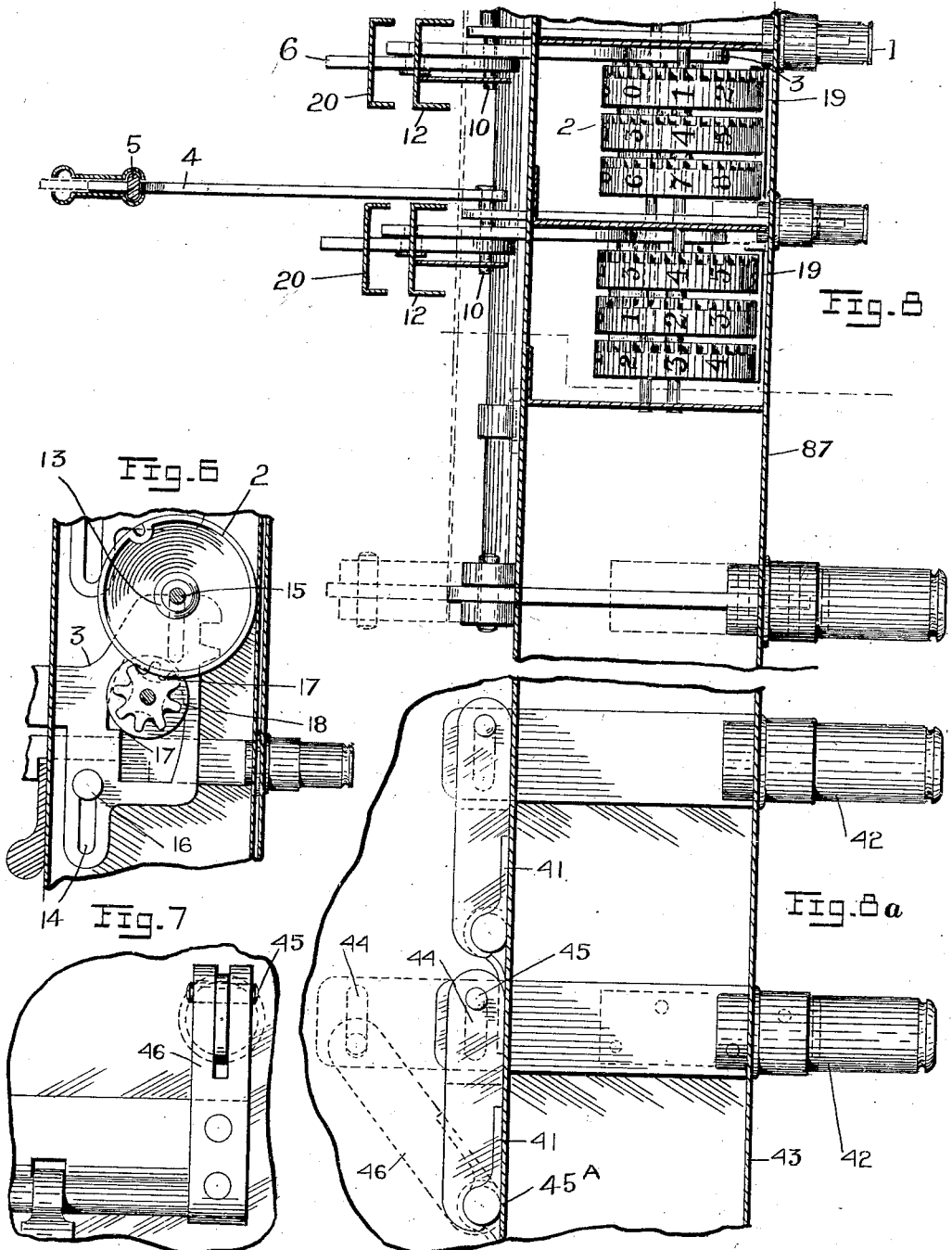

A. McKENZIE.
VOTING MACHINE.
APPLICATION FILED FEB. 12, 1900.
1,066,514.
Patented July 8, 1913.
13 SHEETS—SHEET 5.
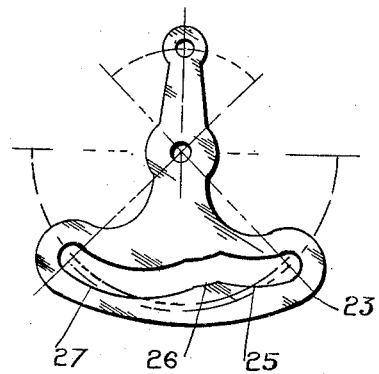
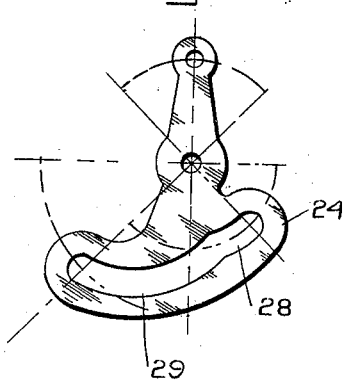
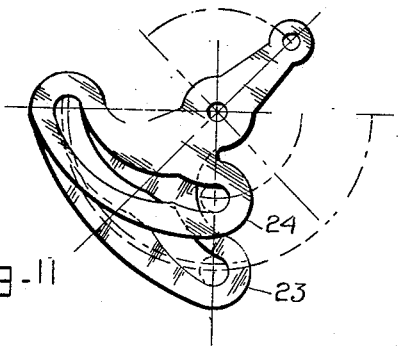
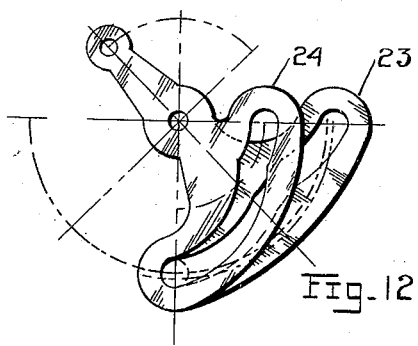
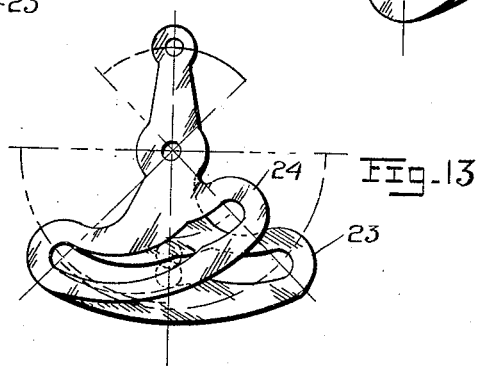

A. McKENZIE.
VOTING MACHINE.
APPLICATION FILED FEB. 12, 1900.
1,066,514.
Patented July 8, 1913.
13 SHEETS—SHEET 6.
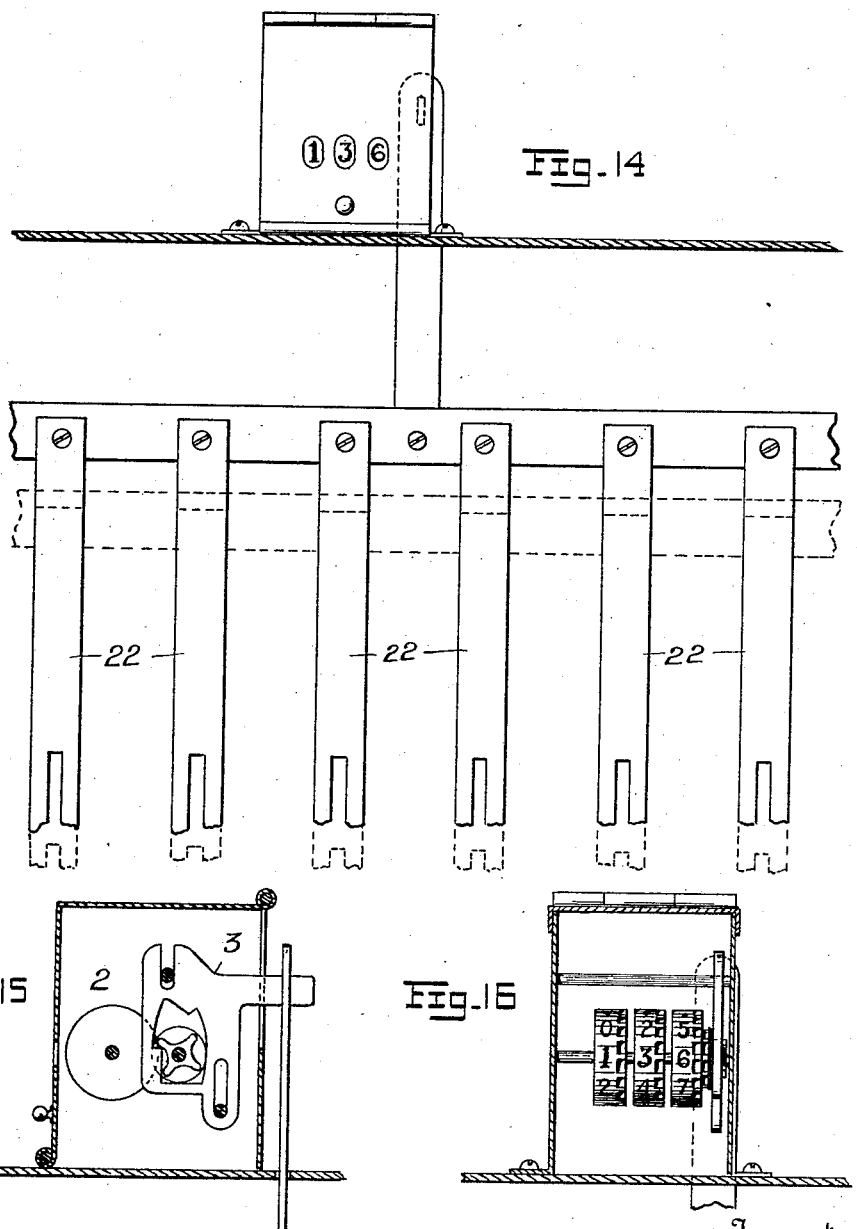

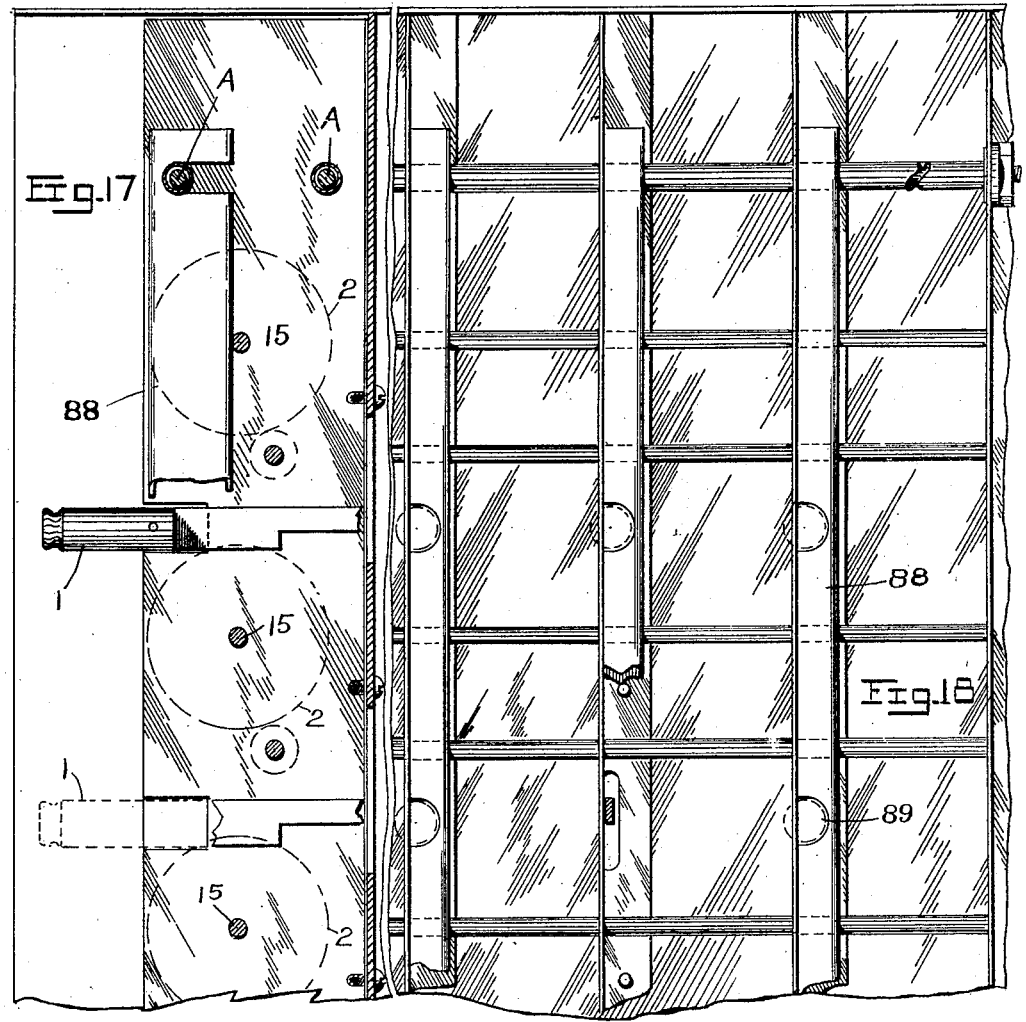
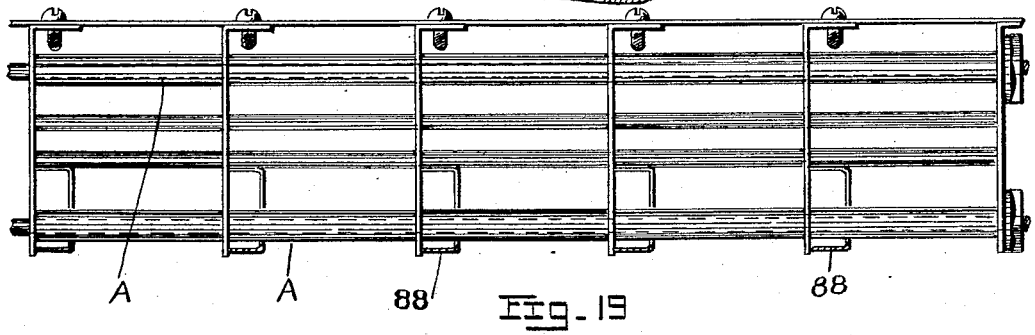

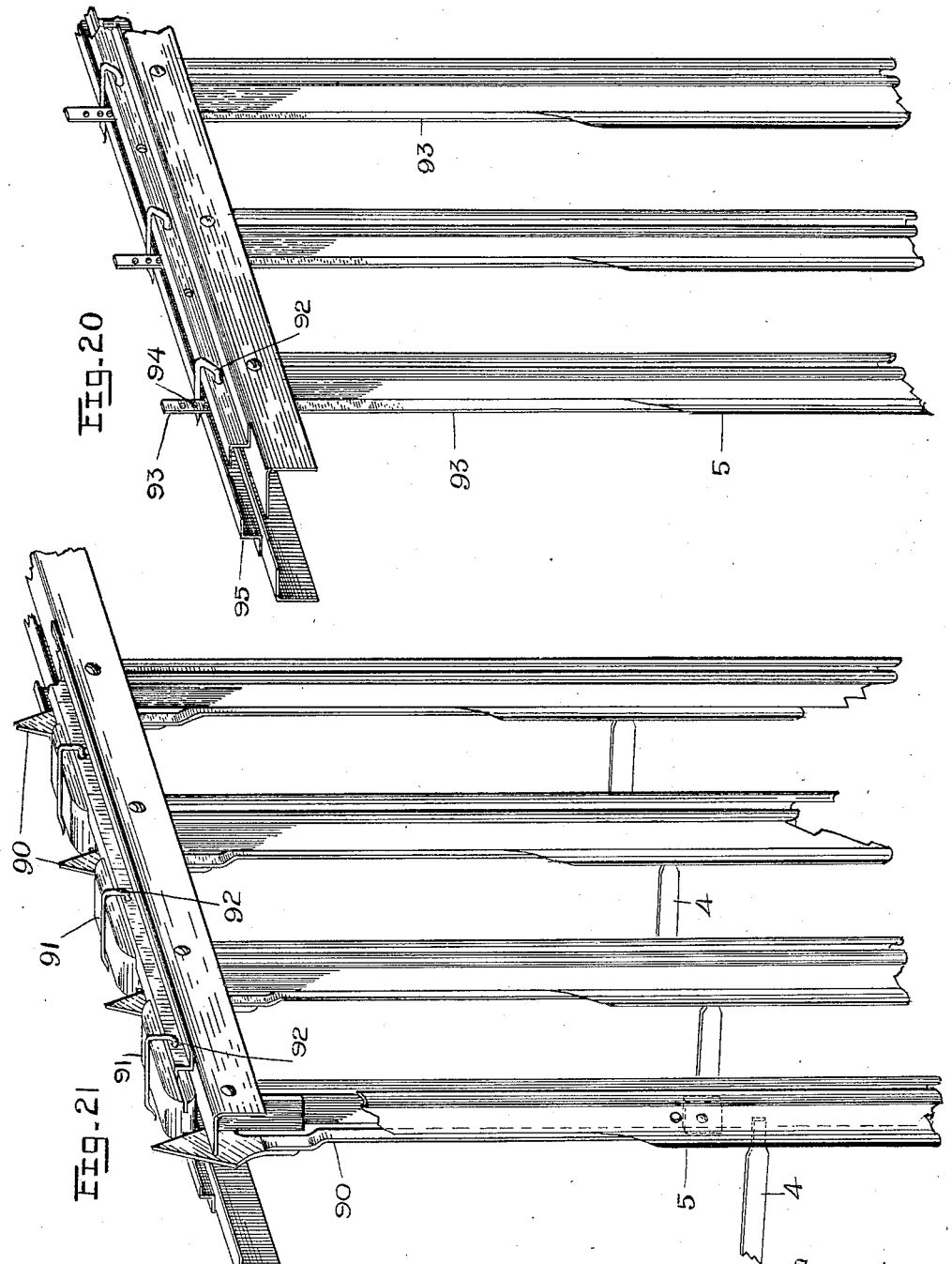

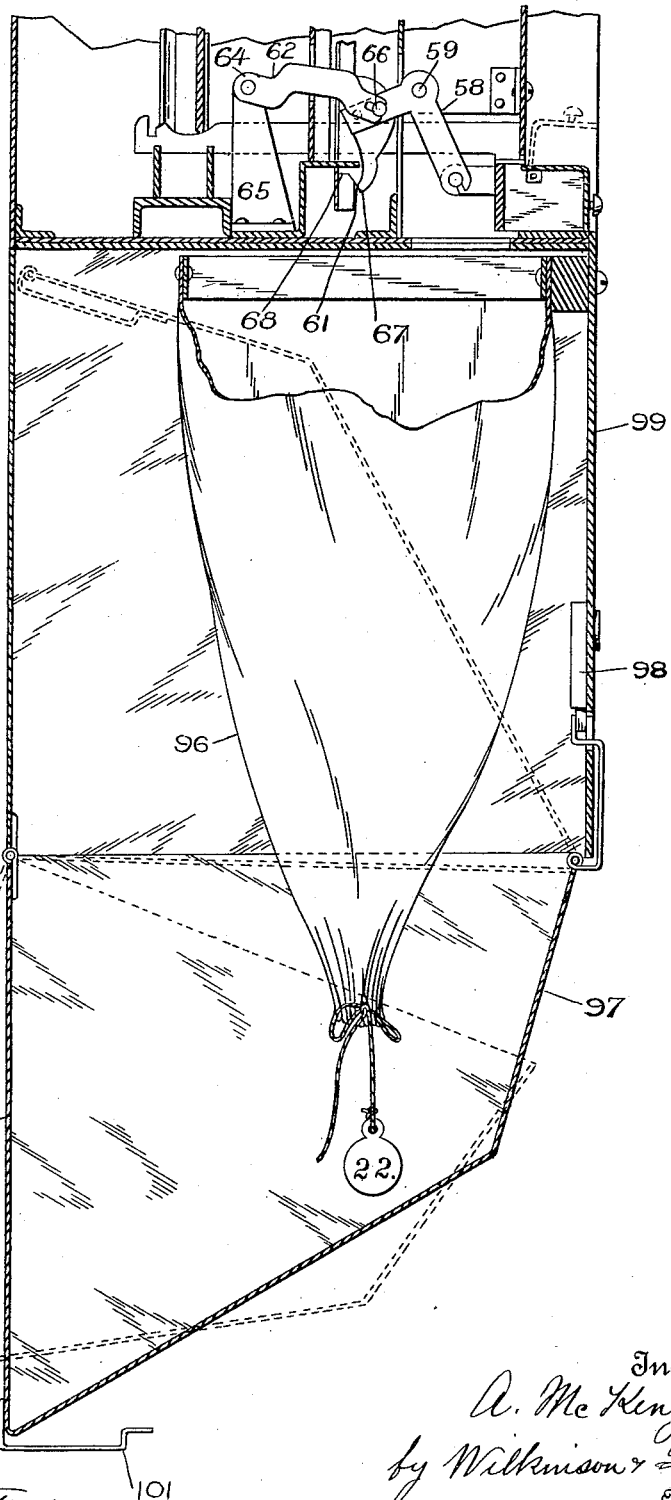

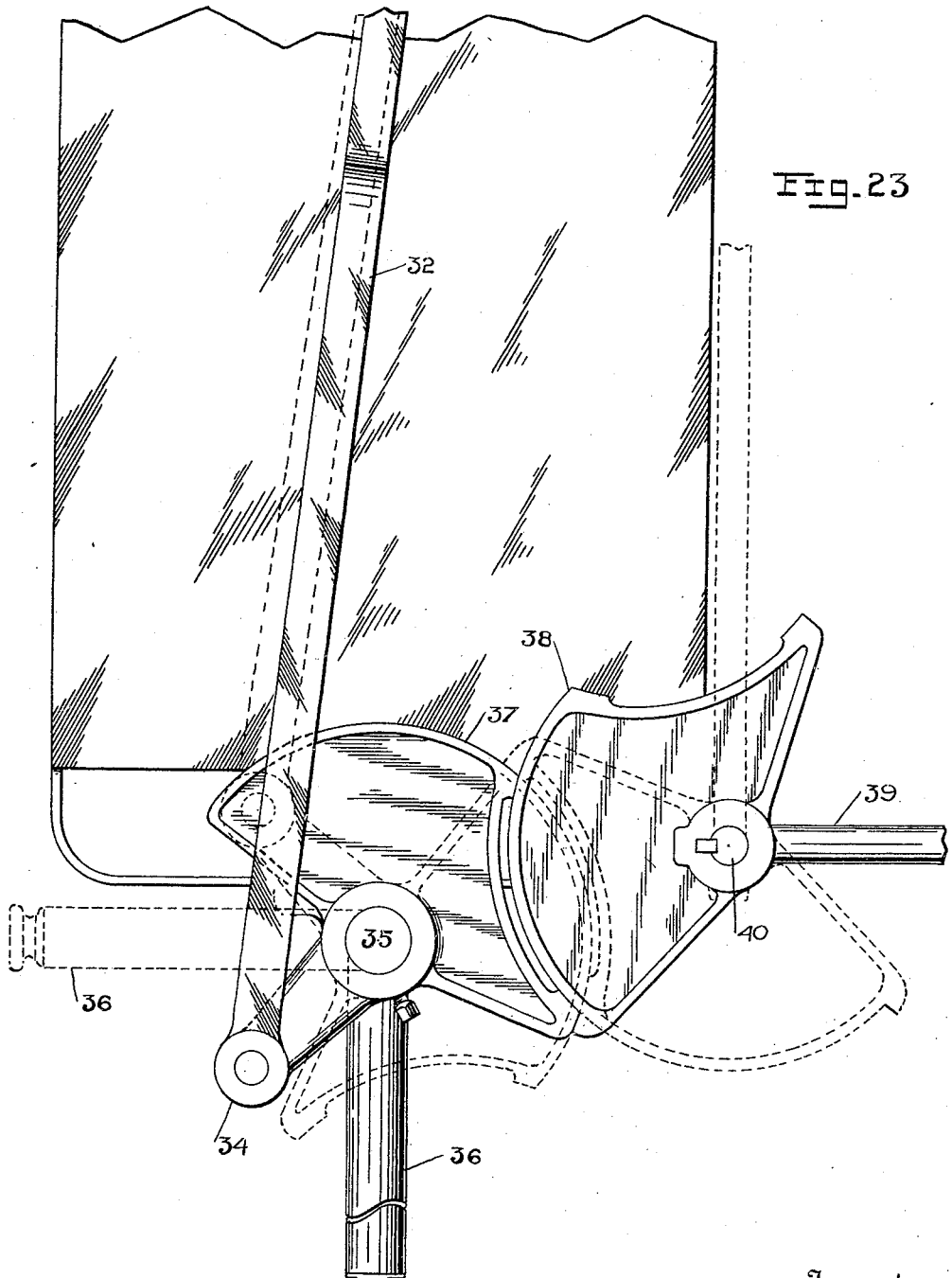

A. McKENZIE.
VOTING MACHINE.
APPLICATION FILED FEB. 12, 1900.
1,066,514.
Patented July 8, 1913.
13 SHEETS—SHEET 11.
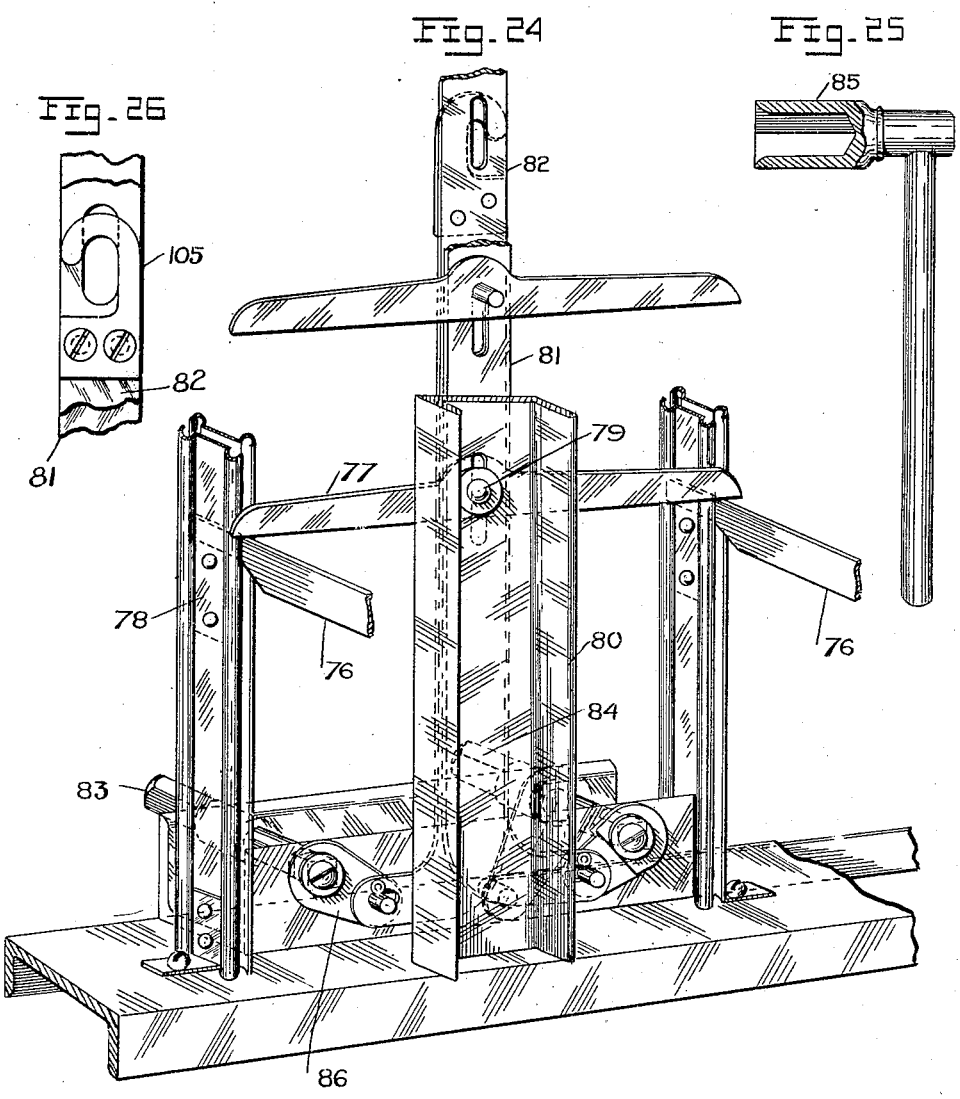

A. McKENZIE.
VOTING MACHINE.
APPLICATION FILED FEB. 12, 1900.
1,066,514.
Patented July 8, 1913.
13 SHEETS—SHEET 12.
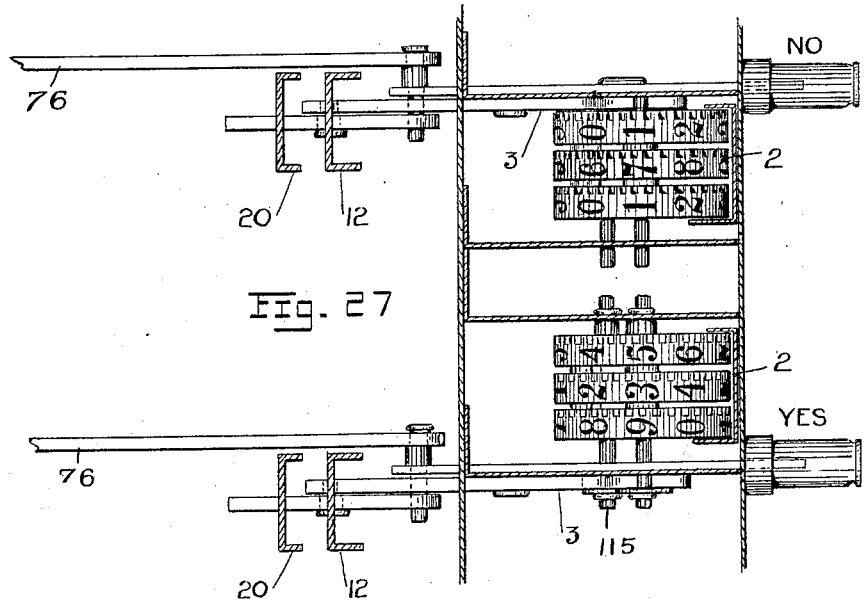
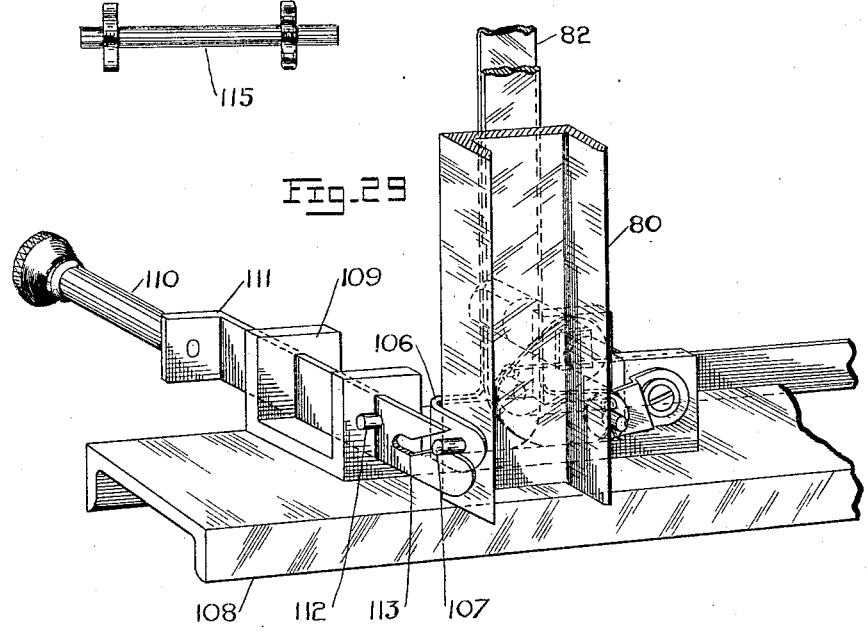

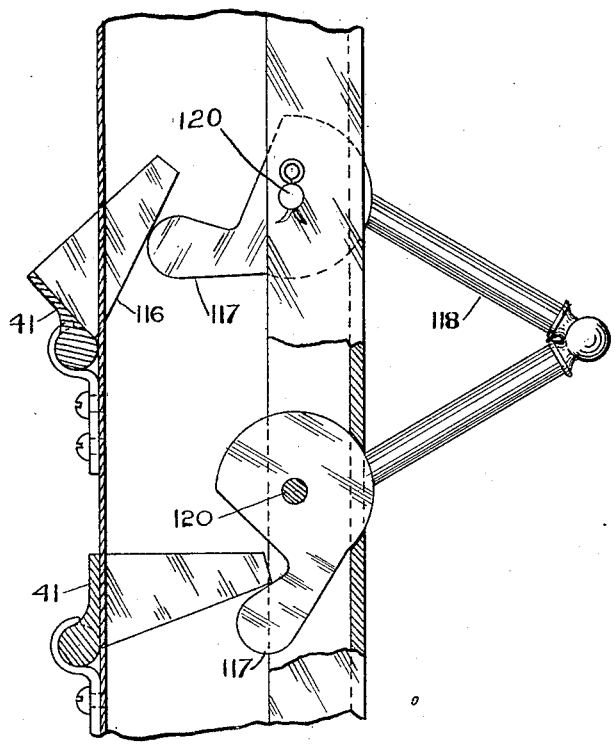
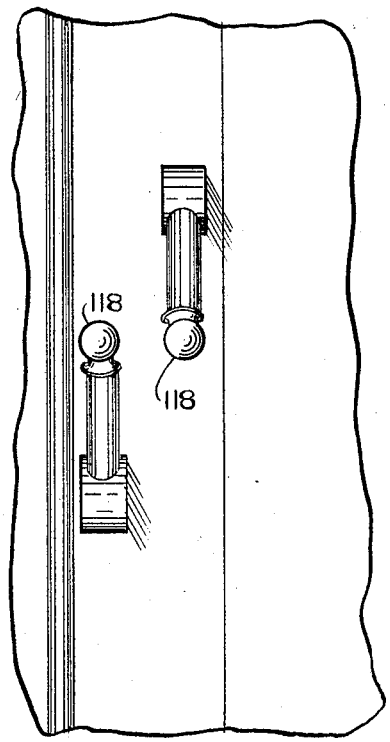
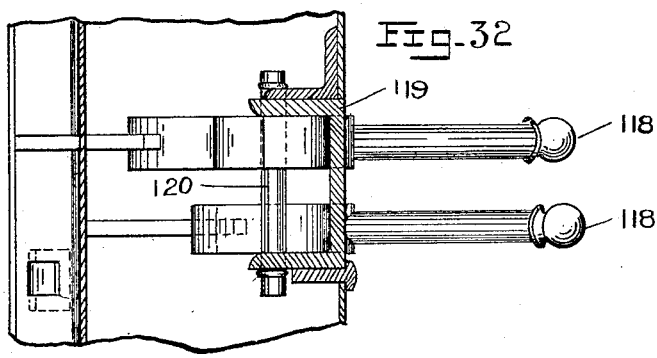

UNITED STATES PATENT OFFICE.

ANGUS McKENZIE, OF JAMESTOWN, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

1,066,514.      Specification of Letters Patent.      Patented July 8, 1913.

Application filed February 12, 1900. Serial No. 4,957.

*To all whom it may concern:*

Be it known that I, ANGUS MCKENZIE, a citizen of Canada, residing at Jamestown, in the county of Chautauqua and State of New York, have invented certain new and useful Improvements in Voting-Machines; and I do hereby declare the following to be a full, clear, and exact description of the invention, such as will enable others skilled in the art to which it appertains to make and use the same.

My present machine has for its object to provide a voting machine which is an improvement on the positive type of voting machines described in the patent to Davis of 526,668 and 549,901 and the machines which are described in my pending applications. In my present invention, the voter can vote a straight ticket and scratch his vote afterward by pulling back the keys which he does not wish to vote and voting others in their stead, the counter in no case being moved until the voter swings an arm or gate on the machine, which is the last act of voting.

The invention also comprises further improvements in construction of voting machines, as will be hereinafter fully described, the novel features being pointed out in the claims.

In the accompanying drawings, Figure 1 is a transverse vertical section through the voting machine, showing the keys, counters, counter-actuators and counter-actuating devices and interlocking systems. Fig. 2 is a front elevation of the key-board of the machine. Fig. 3 is a rear elevation of the counter operating and resetting means. Figs. 4 and 5 are perspective detailed views of the counter operating and resetting devices. Fig. 6 is a detailed view of the voting key, counter-actuator and counter. Fig. 7 is a detailed view of the straight ticket push key and rock shaft. Fig. 8 is a longitudinal transverse section showing the keys, counters and interlocking and counter operating and resetting means. Fig. 8ª is a sectional elevation showing the straight ticket keys and rock shafts. Fig. 9 is a detail of the rocking cam which reciprocates the counter-actuators. Fig. 10 is a detail of the rocking cams which trips the counter-actuator out of the control of the cam shown in Fig. 9 and forces the counter-actuator back to its initial position, completing the count and locking it. Fig. 11 shows these rocking cams pivoted on the same shaft and in the position which they occupy during the movement of the keys. Fig. 12 is a view of the same cams in the position occupied by them after a vote has been counted and the keys reset and locked. Fig. 13 shows these cams in the position they are when the voter is half way out of the booth. Fig. 14 is a rear elevation showing the counter-actuating and tripping bars. Fig. 15 is a sectional elevation of the total counter of the machine. Fig. 16 is a horizontal section of the totalizing counter. Fig. 17 is a sectional elevation of the keys and counters. Fig. 18 is a front elevation of the counter sections with the counters left out. Fig. 19 is a horizontal section of the counter sections of the machine. Fig. 20 is a perspective view of the interlocking system. Fig. 21 is a perspective view of the interlocking system made interchangeable by use of spear heads. Fig. 22 is a sectional elevation showing the free ballot depositing devices and receptacle. Fig. 23 is a top plan view of the gate which conceals the voter during the voting operation, and the arm by which the machine is operated interlocked with said gate. Fig. 24 is a perspective view of the Yes and No lock out. Fig. 25 is the wrench by which the Yes and No lock out is operated. Fig. 26 is a detailed view showing that particular pairs of Yes and No keys may be controlled by the lockout. Fig. 27 is a horizontal section view of a pair of Yes and No keys and their counters with the tripping bars and interlocking wedges. Fig. 28 is a detailed view of the transfer shaft by which the motion of the counter actuator on the left of the counter is communicated to the units wheel on the right of the counters. Fig. 29 is a perspective showing the means of operating the Yes and No lockout by a push key. Fig. 30 is a sectional elevation showing the straight ticket levers and rock shaft and the cam movement by which the lever moves the rock shaft. Fig. 31 is a front elevation of the key board of the machine showing the straight ticket levers. Fig. 32 is a horizontal section of the machine showing the straight ticket levers and their cams.

In Fig. 1, the reference character 1 refers to the voting key. 2 refers to the counter, and 3 refers to the counter actuator. 4 refers to the interlocking wedge which is attached to the voting key 1, and 5, 5 refers to the interlocking blocks with which the interlocking wedges 4 engage. 6 refers to a dog pivoted at 7, to the counter actuator 3, which dog is curved, and has the slot 8 and the lug 9. When the voter votes, he pushes the key 1 to voted position, that is until he cannot push it in any farther. This forces the interlocking wedge 4 between and separates the blocks 5. A pin 10 on the voting key engages with the slot 8 in the dog 6, and as the key is pushed to voted position, it throws the dog from the position shown in connection with the top key in Fig. 1 to the position shown in connection with the bottom key in Fig. 1. In this position the lug 9 of the dog 6 is passed through a slot 11 in the universal bar 12, shown in Fig. 4. The universal bar 12 is individual to and runs parallel with the keys of each single candidate group, and when this bar 12 is raised by means hereinafter described, the counter-actuators are lifted, and the first step is imparted to the counter. The counter-actuator 3 is reciprocated by the universal bar 12, as above described, and is provided with the slots 13 and 14, one of which engages with the shaft 15 which carries the counter, and the other of which engages a pin 16 which is carried by the channel plate. The counter-actuator is of the ordinary two-step escapement type, which drives a four-toothed star wheel by means of the alternate engagement of the pallets 17 with the teeth of the star wheel, as is shown fully in Fig. 6. The alternate engagement of the pallets in a single reciprocation of the counter-actuator moves the four-toothed star wheel 18 through a quarter of a revolution. On its outer side, the star wheel carries a gear of eight teeth, which in turn engages with the gear of twenty teeth carried on the units wheel 19 of the counter. The movement of the star wheel through a quarter of a revolution will move the units wheel of the counter through a tenth of a revolution and count one vote. The motion of the units wheel is communicated to the tens wheel through the ordinary form of mutilated gear transfer device, as is shown in Fig. 16, by means of which the counter wheels are always held in locked engagement with each other, and the movement of the one is positively transferred at proper intervals to the wheel of next higher order. 20 refers to the universal bar, which, acting upon the dogs 6, causes the lugs 9 to be tripped out of engagement with the universal bar 12 at the proper moment for positively returning the counter-actuator and resetting and locking the voting keys. The movements of these universal bars are regulated by means of the cams shown in Figs. 9 to 13 inclusive. The universal bars 12 are all suspended from a common plate 21, and the universal bars 20 are likewise suspended from a plate 22. These plates are reciprocated and governed in their reciprocation by the cams before mentioned, the cams 23 serving to reciprocate the counter-actuators, and the cams 24 serving to trip the dogs and reset and lock the keys.

By reference to Figs. 9 to 13, inclusive, it will be seen that the cam 23 when rotated in the direction located by the arrow in Fig. 11, which is the direction in which it is moved by the voter after voting, will first lift its plate through the active portion of the cam 25 and will then carry it idle during the portion 26 and will then positively force it down by the part 27, returning it to very nearly the same position from which it started with the cam 25. This is the movement which is imparted to the universal bar 12, and by means of which the dogs 6 and their counter-actuators are lifted. The cam 24 has an idle portion 28 which is followed by an active portion 29, which begins to act when the idle portion 26 of the cam 23 is passing the point which connects it to the plate 21, that is, when the universal bars 12 have reached their maximum. The further rocking of the two cams serves to return the universal bars 12 to practically their original position and to push the universal bars 20 down until the lugs on the dogs 6 have been tripped from the slots in the bar 12 and the dogs themselves are returned to their reset position, which resets the keys. The universal bar being held in this position positively prevents the dogs from turning on their pivots 7, thus positively locking the keys against being moved, and also positively holding the counter-actuators 3 from being raised from the position in which they positively hold the quad star wheel in locked engagement, thus holding the counter itself locked against movement.

The cams 23 and 24, as may be seen from Figs. 1, 11, 12 and 13 are arranged in pairs, and one of each is carried on the stub 30, shown in Fig. 1. The plates 21 and 22 are suspended at intervals through their length by these cams, a plurality of them being used for this purpose, preferably as many as four or five of each in each machine, so as to give the plates 21 and 22 a uniformly parallel movement throughout their length, so that the operation of the various universal bars will be the same throughout the whole machine. The plate 21 and the bars 12 secured to it at right angles thereto, there being one of these bars 12 for each vertical row of counters, constitute a frame which is movable edgewise to actuate the registering mechanisms, the locking mechanisms being at the same time returned to their normal position. These cams, as is shown in Fig. 3, are connected to the reciprocating rod 31 by means of which they are rocked in unison, and this reciprocating rod 31 in turn is reciprocated by means of the connecting rod 32, which engages with the connecting rod 31, by means of a pin 33 carried on the connecting rod 31, which projects up through a hole in the top of the casing where the connecting rod 32 is fastened to it. The connecting rod 32, at its other end, is fastened to a crank 34, which is carried at the top of the shaft 35 which is carried on the end of the machine in suitable bearings. The shaft 35 has at its lower end the arm 36, by means of which it is rocked by the voter before and after voting. The shaft 35 also carries at its top a cam 37, which interlocks with a cam 38, by means of which a door 39 on the end of the machine is controlled. Thus, when the voter enters the booth to vote, he pulls the arm 36 from the position shown in dotted lines in Fig. 23 to that shown in full lines. This unlocks the cam 38, which then can be rotated from the position shown in dotted lines in Fig. 23 to that shown in full lines. This cam is carried at the top of the shaft 40 to which the door 39 is fastened, and when the cam 37 is placed in the position shown in full lines in Fig. 23, the cam 38 is then released, so to speak, whereupon the cam and its shaft and door can be rotated to the position shown in full lines, which the voter does when he is before the machine. The door 39 serves as a screen, which prevents anyone from seeing what the voter is doing, and, while he has the door in this position, no one can move the arm 36 and reset and lock the machine until he has finished arranging his ballot. After voting, he places the door in position shown in dotted lines, when he can then swing the arm 36 to its dotted line position, which rocks the cams 23 and 24, by means of which his vote is counted and the keys are positively reset and the keys and counters are locked. The plates 21 and 22 run the full length of the machine and are suspended at intervals from the cams 23 and 24, as above described, and each plate carries for each single candidate group on the key-board of the machine its universal bar 12 and 20, by means of which the vote is recorded and the voting mechanisms are reset and locked.

41 represents the rock shafts, such as are shown in Figs. 1 and 3, by means of which all the keys in a party row are operated simultaneously. These rock shafts 41 are operated by the large push buttons 42, as shown in Fig. 8. They are guided in the front plate 43 and the main plate 45ª of the machine and they carry at their inner end the slot 44, with which engages a pin 45, carried on the lever 46, by means of which the straight ticket rock shaft 41 is rotated. When one of these large push buttons 42 is shoved home, it carries with it all of the keys of that party row, and if the voter then swings the gate on the end of the machine, he will have indicated and registered a complete straight ticket vote.

Reference to Fig. 1 will show a device for operating a check up counter. When the key 1 of a single candidate group is moved to voted position, it acts upon the cam 47 and raises the universal bar 48, as is shown by the operation of the lowest key in Fig. 1. The universal bar 48 is provided at its lower end with a slot 49, which engages with the pin 50 carried by the dog 51, which is similar to the dog 6, but which is thrown out of operation by throwing any of the others in its group into operation. The raising of the bar 48, by means of the pin and slot connection 49 and 50 rotates the dog 51 around its pivot 7 in a way to throw the lug 9 out of engagement with the universal bar 12, so that when the universal bar 12 is operated, the counter-actuator 3 of the tell-tale counter will not be moved. This means, then, that the tell-tale counter will be operated only when a vote has not been cast in its single candidate group, and if the registration on the tell-tale counter be added to the sum of all the other counters in its group, the total should equal the number of voters who have used the machine, or the indication on the totalizing counter shown in Fig. 15.

55 refers to my improved form of free ballot depositing devices. When the voter wishes to vote for any candidate who has not been nominated by any political party, he writes the name of the candidate on a slip of paper which he places inside of a metal capsule, which the judges furnish for this purpose, and lifts the door 56 of the free ballot depositing device, shown in Fig. 1, and places the metal capsule therein. He then shoves it into voted position. The interlocking wedge 57 is connected to the free ballot depositor, and by it all the keys in that group are locked. As the free ballot depositor is pushed in, it rotates the bell crank 58 around the center 59. The bell crank 58 is connected at 60 with the arm 63 carried integral with the free ballot box. The link 62 is pivoted at 64 to the standard 65, and, at its free end, has the slot 61ª, which engages with the pin 66, carried on the bell crank lever. As the bell crank lever is rotated, the link 62 is carried up with it. The locking dog 67 is pivoted to the arm 61 of the bell crank lever, and when the free ballot depositor is pushed in it is raised so that the lug 68 thereon engages with the slot 69 in the universal bar 12, into which it swings by gravity when it is raised sufficiently high by the bell crank lever. The upper part of the dog 67 runs into the top of the slot in the universal bar 12, which prevents it from being raised higher, and this, in consequence, locks the free ballot box from being shoved in far enough by the voter to allow the ballot to drop through the opening 70 in the base plate of the machine. The dog 68, after it has engaged the slot in the universal bar 12, hangs in such a position by gravity that if an attempt is made to pull the box 56 out, the dog 68 will strike against the bottom of the slot and bind, preventing the reverse movement of the box 56. The dog 68 swings into this locking position by gravity, as soon as it has cleared the bottom of the slot in the bar 12. Consequently the box 56 is held locked against return after it has once been pushed in. The dog 68, having engaged with the universal bar, prevents the free ballot box from being drawn back, so that the voter can change his vote. When the voter passes out from the booth and swings the arm on the end of the machine, the raising of the universal bar 12 rotates the bell crank lever still farther and pulls the ballot box in to such a position that the ballot will drop through the opening 70, and then the reverse movement of the universal bars 12 and 20 will positively reset and lock the ballot box against operation.

The interlocking system of my machine is substantially the same as that shown in my pending application of recent date, the interlocking blocks being carried in a channel where they interlock with the wedges which are carried by the voting keys, and when the predetermined number of voting keys have been operated the rest of the voting mechanisms are locked against operation until the voter withdraws some of the keys, or until they are reset by the machine and unlocked by the next voter.

The woman's lock out is shown in rear elevation in Fig. 3. A sliding bar 71 is provided, to which, at intervals, cams 72 are fastened by the screws 73. These cams are so shaped that when the bar which carries them is slid longitudinally by means of the connecting rod 74 and crank 75, the free ballot wedge 57 will be raised sufficiently high to take up all the loose space between the interlocking blocks 5, which will prevent the insertion of any of the wedges 4. By fastening these cams 72 on the bar 71, it is possible to lock up any or all of these channels in this way, so that certain ones may be left off and others put on. When a woman wishes to vote, who is only qualified to vote on school trustees, etc., the woman's lock out bar, having been previously arranged as described, the judge, who is sitting behind the machine, operates the crank 75 and connecting rod 74, which slides the woman's lock out bar to its locking position, preventing the operation of the keys in any of those groups which she is not entitled to vote. This will also prevent the operation of the straight ticket keys, as it is obvious that if any one or more candidates of any straight ticket cannot be voted for, it will be impossible to operate the straight ticket key.

The question lock out is shown at the right hand side of Fig. 3, and a preferred modified form of this is also shown in Fig. 24. The Yes and No keys are provided with interlocking wedges 76, and they are interlocked against each other by means of the lever 77. The wedges rest upon fixed abutments 78 in the interlocking channels, and they rise in the channels only so far as the interlocking levers 77 will permit. The lever is pivoted at 79 at such a height as to allow one and one only of the wedges 76 to be pushed in, which lifts one end of the lever and presses the other, preventing the insertion of the other wedge. The pivot 79 of the interlocking lever 77 is made sliding along the channel 80, so that the pivot 79 can be pulled down by the lock out bar 81, in such a way that neither end of the lever 77 can be lifted by the interlocking wedges, which effectually prevents the operation of any of the keys. The lock out bar 81 is provided, by means of which all of the interlocking levers will be locked against operation, and the lock out bar 82 is provided which carries adjustable stops 105, so that any predetermined number only of the interlocking levers 77 may be locked down against operation. Either or both of these lock out bars may be operated by the judge, and, if desirable, any number of these lock out bars may be provided in order to get any number of combinations of lock outs according to the class of voters that are to use the machine. These lock outs are operated by studs 83 and 84, which are operated by a wrench such as is shown at 85 in Fig. 25. Placing the wrench upon the stud and rotating it, throws the crank 86 down, pulling its lock out bar with it to the locking position, and it will be readily seen that either or both of these lock outs may be operated in this manner. One of these studs, with its crank, may be connected to and operated in unison with the woman's lock out, as is shown in Fig. 3, where a Yes and No lock out bar is placed in such a manner as to be operated along with the woman's lock out. Thus, it will be seen that any desired arrangement of lock outs may be provided in connection with this machine.

The face plate 87 of the machine, as shown in Fig. 1, is made removable, so that it can be removed to facilitate the resetting of the counters. The counters are held positively in working engagement with each other by means of the take up strips 88, as are shown in Figs. 17 and 19. These strips prevent the counter wheels from spreading out of positive engagement with each other, and they can be removed only when the face-plate has been taken from the machine when it is desirable to reset the counters by spreading the counter wheels apart and resetting each of them separately. These take up pieces 88 are recessed with semi-circular holes 89, as may be seen in Fig. 18, which permits the voting key to pass them as it is moved in and out by the voter.

Figs. 20 and 21 show my improved interlocking system, by which the interlocking of the various groups is made interchangeable. Pivoted to the top interlocking block 5 in each channel is the spear head 90, which engages with the channel blocks 91, which are held against longitudinal movement by means of the pins 92. If the interlocking system is divided into single candidate groups, then the voting of any key in that group will raise the spear head one step, bringing it against the blocks, which prevents the spear head from rising farther, and, consequently, prevents the operation of any more keys in that group, unless the key operated has been reset. In order to throw any number of groups together, all that is necessary to do is to pull out the pins 92 which hold the blocks between them stationary, when the blocks themselves can be moved so as to interlock the various groups with each other. In Fig. 20, I have shown how ordinary single candidate groups may be provided for, omitting the spear heads and block in the top channel. The long interlocking blocks 93 are provided with a plurality of holes 94, by means of which they can be adjusted vertically, but the pins 92, in this case, instead of passing through the interlocking channel 95, mid-way between the groups, passes through the channel directly at the group. The block 93 should be adjusted in height so that one key and no more can be voted, but, if desired, it can be adjusted so that two or more keys can be voted.

In Fig. 22, I have shown the bags 96 in which the free ballots are collected during an election and the receptacle 97 for holding these bags locked up during the progress of the election. After the election is over, the lock 98 is unlocked so that the trough 97 can be swung to the position shown by dotted lines, when the bags 96 may be opened by means of loosening the draw strings in the bottom of the bags, when the ballots may be turned out and counted. When it is desired to store the machine, the receptacle 97 may be turned up inside of the lower compartments 99 of the machine, as is shown also in dotted lines in Fig. 22, so that the back of the receptacle 100 then becomes the bottom of the machine, in which position it may be locked by the hasp 101.

Fig. 29 shows another device which I have used to operate the Yes and No lockout. The bar 82 at its bottom passes through any suitable guide and is off set and bent around the channel 80, which separates it as shown at 106 and in its end it carries the pin 107. On the bottom channel 108 I place the guide 109 for the push key 110, this key is offset at 111 at one end and at its farther end the pin 112 which limits the forward and backward movement of the key. At its forward end it also carries the cam slot 113 which engages with the pin 107. As the key is pushed in it pulls the pin 107 and the locking bar 82 down by the means of the engagement of the active operation of the cam 113 with the pin, until the pin goes into engagement with the idle operation of the cam and the further movement of the key securely locks the pin 107 and the bar 82 from rising. The adjustable stop 105 on the bar 82 pulls the locked levers 77 down to such an extent as to lock all the wedges 76 against movement.

In Fig. 27 I have shown a pair of Yes and No keys with the interlocking wedges therefor. It is advisable in placing Yes and No keys to provide as great a distance between the two keys as possible for the label which states the question to be voted on and in order to do this the No key is placed on the right of its counter as is the case in all the other keys and counters through the machine but the Yes key is placed on the left of its counter and in consequence of this the counter actuator 3 is also placed along with the key on the left of its counter. The units wheel of the counter is always carried on the right and the motion of the counter actuator on the left of the counter is communicated to the units wheel on the right of the counter through the shaft 115 shown in Fig. 28. This shaft carries on its left hand end the quad or four point wheel which is shown in dotted lines in Fig. 6 and on its right hand end it carries the eight tooth pinion which engages with the twenty teeth on the units wheel of the counter carrier. This shaft 115 is the transfer shaft and carries the transfer pinion for communicating the motion between the units and tens and carries the transfer pinions on it for communicating the motion to the tens and hundreds wheels from the units wheel. This arrangement reverses the relative position of the quad and eight tooth wheel and also separates them. The counter actuators in the case of the Yes and No keys are operated by the universal bars 20 and 12 just as are counter actuators through the rest of the machine.

In Fig. 30 I have shown the straight ticket rock shafts 41 and the new cam device by which they are operated. The straight ticket rock shaft at its end carries the lug 116 which is engaged by the cam 117 when the lever 118 is pulled down. This rotates the rock shaft 41 and by it all the keys are carried to their voting position.

As shown in Figs. 31 and 32 the levers 118 are staggered so that when one of them is pulled down it does not interfere with the straight ticket lever next to it. These straight ticket levers are screwed into the cams 117 and when any particular party row is not in use, extra ticket levers may be left off the machine which to that extent prevents the voter making a mistake. These cams 117 are carried in the channel iron 119 and are fastened to said iron by means of the pivots 120.

It is obvious that many changes in detailed construction both in form and character may be made without departing from the spirit of my invention.

What I claim as new and patentable is as follows:

1. The combination in a voting machine of a counter, an actuator therefor, means for moving said actuator, a voting key, said means being freely movable into and out of acting position by said voting key, and a plurality of bars, the motion of said actuator being secured by said bars acting upon and controlling said means.

2. The combination in a voting machine of keys and counters, said counters being mounted in a stationary frame and interlocking mechanism therefor, with a universal bar, an actuator for each of said counters which remains stationary during the voting operation but which is moved by the universal bar subsequently thereto.

3. The combination in a voting machine of means for indicating a vote, means for registering a vote, a universal bar and means for locking said registering means, said locking means remaining stationary when the vote indicating means is operated and being moved by said universal bar to move the counter subsequent to the voting operation.

4. The combination in a voting machine of a counter and counter actuator, said counter actuator carrying thereon a pivoted device, an operating bar, said pivoted device being freely movable into and out of engagement with said operating bar, a voting key, means on said voting key to position said pivoted device relatively to an operating bar, and means for operating said bar subsequently to move the counter and counter actuator.

5. The combination in a voting machine of a voting key movable freely into and out of voted position, a counter actuator controlled thereby, the movement of the counter actuator being subsequent to the voting operation of the key, and means carried by said counter actuator which connects said counter actuator to the operating parts of the machine when the key is voted.

6. The combination in a voting machine of a voting key which moves longitudinally, a counter actuator controlled by said key which moves transversely thereto, an auxiliary bar and means provided in connection with the key and actuator for securing the transverse movement of the actuator from said auxiliary bar when said key is voted.

7. The combination in a voting machine of a key and counter and actuator for said counter, a dog pivoted on said actuator, a pin carried by said key controlling said dog and a universal bar with which said dog engages when the key is moved to voted position.

8. The combination in a voting machine of voting keys, counter actuators and counters, said counters being mounted in a stationary frame, said keys in the machine being capable of independent, successive or simultaneous operation without moving their counters or their actuators, with means attached to said counter actuators, whereby the counters of the keys are simultaneously operated.

9. The combination in a voting machine of voting keys, movable freely into and out of voted position, arranged in groups, counters and counter actuators, said keys moving longitudinally to their voted positions, and means operated by said keys to secure the movement of their counter actuators in a plane common to each group and parallel to the movement of the voting keys therein.

10. The combination in a voting machine of a key, a counter, and a counter actuator therefor, said counter being mounted in a stationary frame, said key being movable to voted position without moving the counter actuator, means operated by said key to secure the subsequent movement of its counter actuator, and means for moving its counter actuator subsequently to operate the counter.

11. The combination in a voting machine of voting keys, a counter for each of said keys, said keys and counters being arranged in single candidate groups, and means in said group for indicating the number of times the machine is operated without a vote being indicated in said group.

12. The combination in a voting machine of a series of voting keys and counters arranged in single candidate groups, a check up counter provided in each group, and means for operating said check up counter which is rendered inoperative by the operation of any of the keys in the group.

13. The combination in a voting machine of a series of keys and counters arranged in groups, a check up counter provided in each group, and means for operating said check up counter to indicate votes not otherwise registered in said group.

14. The combination in a voting machine of a series of voting keys and counters, an actuator for each counter, a dog pivoted thereon thrown into operating position by the voting of the key, a check up counter in each group, and an actuator for each counter with the dog pivoted thereon which dog is rendered idle by the operation of any of the keys in the group.

15. The combination in a voting machine of voting mechanisms, universal bars for operating the selected voting mechanisms, and a check up counter arranged in connection with said voting mechanisms, said universal bars operating the check up counter, only when moved without any vote being indicated on the regular voting mechanisms.

16. The combination in a voting machine of a series of counters carried on a stationary frame, said counters being arranged in office lines, means normally in position operating a particular counter of each office line, said means being rendered inoperative by the operation of any one of the other counters of its office line whether said office line is a single candidate group or inclined in a multicandidate group.

17. The combination in a voting machine of a series of counters arranged in single candidate groups, a check up counter for each group, and means relating the counters in each group so that the sum total indicated by the counters in each single candidate group will be equal throughout the machine.

18. The combination in a voting machine of a series of voting mechanisms consisting of keys and counters and counter actuators arranged in single candidate groups, a check up counter for each group, and means which will operate at least one counter for each group for each operation of the machine.

19. The combination in a voting machine of a series of voting mechanisms comprising counters and counter actuators, and a voting key for each counter, and a separate check-up counter for said series, a universal bar for the check-up counter, and a universal bar for the counter actuators, a dog on each of said actuators, a pin on each of said voting keys whereby the movement of each key connects the dog on its corresponding actuator with the universal bar, said pin also operating when its key is moved to voted position to move the universal bar to render the check-up counter idle.

20. The combination in a voting machine of a series of voting mechanisms comprising the keys, counters, said keys being incapable of directly operating their counters and a pair of universal bars for securing the operation of the counters in each single candidate group, a pair of independent cams for operating said universal bars, said bars being moved successively and simultaneously by said independent cams.

21. The combination in a voting machine of a series of voting mechanisms arranged in single candidate groups, and universal bars through which the vote is registered on said voting mechanisms, said bars being arranged in pairs in each single candidate group, a pair of cams to move said bars to secure the registering of a vote, said cams being moved simultaneously to secure the coöperative movement of the universal bars.

22. The combination in a voting machine of a counter actuator having a dog pivoted thereto, a bar, said dog being capable of movement into and out of engagement with said bar, a key capable of moving said dog freely into and out of engagement with said bar, said bar acting through said engagement to move the counter actuator in one direction, and a second bar operating to move the counter actuator in the reverse direction, said bar also operating to reset and lock the voting key and disengage the dog from the first mentioned bar.

23. The combination in a voting machine of a series of voting mechanisms consisting of keys, counters, and counter actuators, a dog pivoted to each counter actuator and a pair of universal bars with one of which said dog can engage, said dog being freely movable into and out of engagement with said bar by said key, said dog being moved subsequently by its universal bar, for the purpose of driving its counter actuator in one direction, said dog and its counter actuator being moved in the opposite direction by the other universal bar, which also positively resets and locks the dog and the voting key.

24. The combination in a voting machine of a counter actuator and a pair of bars operating on said counter actuator to secure the registration of a vote, one of said bars which secures the first movement of the counter actuator being reciprocated substantially an equal distance in both directions, the other bar being moved substantially in but one direction during the registering of the vote.

25. The combination in a voting machine of a plurality of parallel reciprocating bars, a device reciprocated thereby to secure the registration of a vote, one of said bars being reciprocated twice as often as the other.

26. The combination in a voting machine of registering mechanism, a pair of universal bars for securing the registration of a vote, and cams moving simultaneously in one direction to reciprocate one of the bars and move the other bar in one direction.

27. The combination in a voting machine of registering mechanism, including counters, a plurality of parallel universal bars for securing the operation of the counters, said bars being arranged in pairs, and means for coördinating the movements of the bars in each pair to secure the movement of the counter, and the resetting and locking of the keys.

28. The combination in a voting machine of counters, reciprocating means on the machine operated by the voter after voting to secure the registration of the vote thereon a plurality of parallel universal bars operated by said means, said bars being arranged in pairs to secure the movement of the counters and the registration of the vote.

29. The combination in a voting machine of counters, reciprocating means carried on the machine, said means being operated by the voter after voting, a connecting rod operated by said means, a plurality of cams arranged in pairs, said cams being operated by said rod, and universal bars operated by said cams to secure the registration of the vote.

30. The combination of a voting machine of a series of rocking cams arranged in pairs, a pair of bars carried by said rocking cams, reciprocating universal bars carried by said bars, and means to rock said cams to raise and lower said bars.

31. The combination in a voting machine of a series of rocking cams arranged in pairs, like cams of said pairs supporting bars which are connected therewith, and a plurality of universal bars connected to said bars and moved thereby to operate selected members of the voting mechanisms.

32. The combination in a voting machine of rocking cams arranged in pairs, a pair of bars connected with said cams, each bar being connected to like cams of said pairs, and a pair of universal bars individual to each single candidate group of voting mechanisms throughout the machine, one of the universal bars in each pair being moved by one of the supporting bars and serving to move the counter actuator in one direction, the other bar in each pair serving to move the counter actuators in the reverse direction and to reset and lock the voting mechanisms.

33. The combination in a voting machine of a pair of supporting bars 21 and 22, cams arranged in pairs for resetting said bars, universal bars arranged in pairs, one pair of said universal bars being connected to said supporting bar individual to each single candidate group of keys in the machine.

34. The combination in a voting machine of voting keys, a pair of universal bars individual to each single candidate group, slots in said universal bars individual to each voting key, counter actuators and a dog carried by each counter actuator permanently engaging with the slot in one of said bars and engaging with the slot in the other bar when its key has been moved to indicate a vote.

35. The combination in a voting machine, of a pair of universal bars, a counter actuator, and a dog pivoted thereto, one end of said dog projecting through the slots in both universal bars, and having a shoulder for engaging one of the universal bars when its key has been moved to voted position.

36. The combination in a voting machine of a counter actuator, a dog pivoted thereto, a voting key, said key having a sliding engagement with such dog, a pair of universal bars having slots therein through which said dog passes and which permits the reciprocation of said bars without disturbing the position of the counter actuator when the key has not been voted.

37. The combination in a voting machine of a counter actuator, a dog pivoted thereto, a pair of universal bars provided with slots through which said dog extends, the movement of the voting key serving to throw a shoulder carried by the dog into the slot on one of the bars by means of which the counter actuator is moved in one direction, the movement of the other universal bar serving through its permanent engagement with the dog to move the counter actuator in the reverse direction and lock the counter actuator and voting key.

38. The combination in a voting machine of parts adapted to be operated by a voter, two sets of universal bars, each bar of one set being paired with a bar of the other set, a set of cams for moving each set of universal bars, said cams being arranged in pairs, and means for moving said cams to move said bars.

39. The combination in a voting machine of voting keys, universal bars, cams for moving said bars, one set of said cams being provided with an idle portion and an active portion to move its bars in one direction, the other cam being provided with an active portion to move its bars in a certain direction, an idle portion to hold such bars against movement for a short period, and an active portion to move them in the same direction as the other universal bars are moved.

40. The combination in a voting machine of voting keys, counter actuators, universal bars arranged in pairs, cams for moving said bars, one set of said bars being moved in one direction by its cams, and then substantially an equal distance in the opposite direction, the other bars being successively held idle, and subsequently moved in the same direction as the other universal bars are moved during their final movement, and simultaneously with them during said final movement.

41. The combination in a voting machine of a voting key a counter actuator, a dog pivoted thereto, said dog having a sliding engagement with the voting key, a pair of universal bars for moving said counter actuator through said dog, said dog having a shoulder movable into and out of engagement with one bar and a lug in permanent engagement with the other bar.

42. The combination in a voting machine of a key, counter actuator and a pivoted dog connecting them, with a pair of universal bars for moving selected ones of the counter actuators through said pivoted dogs, one of said universal bars serving to positively move the counter actuator in one direction and the other universal bar serving to move it positively in the reverse direction.

43. The combination in a voting machine of a key and counter actuator and the pivoted dog connecting them, a pair of parallel reciprocating bars, said dog being so shaped that it may be temporarily connected with one bar to secure its movement by both bars.

44. The combination in a voting machine of a series of counter wheels arranged in a channel and carried on shafts running through said channel, said counter wheels being capable of moving along such shafts to facilitate the resetting thereof, and removable means provided in said channel to prevent said counters from being spread.

45. The combination in a voting machine of a series of counters carried in a channel, shafts running through said channel upon which said counters are carried, the wheels of said counters being capable of being spread along such shaft to facilitate resetting, and a channel bar capable of insertion between the counter wheels and the side of said channel to prevent the spreading of the counter wheels.

46. The combination in a voting machine of a series of counters in a channel, shafts running through said channel, a key for each on which the counter wheels are carried, and a removable device which holds said counter wheels from being spread along the shaft, said device being recessed in places to permit the uninterrupted movement of the voting key.

47. The combination in a voting machine of a series of free ballot depositing devices, one for each single candidate group, means interlocking said free ballot device with the regular balloting devices, and a pair of universal bars for operating upon the balloting devices of each group, said bars operating upon the selected balloting device to complete the casting of the vote indicated thereon.

48. The combination in a voting machine of a free ballot depositing device, and a pair of universal bars controlling the movement thereof, said bars preventing the movement of said balloting device directly by the voter further than to indicate his ballot without casting it, said ballot depositing device being operated upon subsequently by the universal bars to deposit the ballot contained therein after which it is reset by such universal bars.

49. The combination in a voting machine of a free ballot depositing device, a bell crank lever connected thereto, and pivoted link, having a sliding engagement with said bell crank lever, a dog carried by said bell crank lever, and a pair of universal bars, said dog engaging on one of said bars when the free ballot is voted to secure the subsequent depositing of said free ballot, and to prevent the free ballot from being withdrawn, said link operating in connection with one of the universal bars to prevent the voter from moving said free ballot device beyond a predetermined point, said universal bars operating subsequently to cause the deposit of the free ballot and reset the free balloting device.

50. The combination in a voting machine of Yes and No keys arranged in pairs and provided with wedges, and a lever interlocking with said wedges, whereby only one of the paired keys can be operated by a voter.

51. The combination in a voting machine of Yes and No keys arranged in pairs provided with wedges, and a lever for interlocking with said wedges, said lever having a sliding engagement with its support.

52. The combination in a voting machine of Yes and No keys arranged in pairs, a wedge for each key and a lever for interlocking the wedges of each pair of keys, and means for moving said levers to lock both keys against movement thereby.

53. The combination in a voting machine of voting keys arranged in groups, a wedge for each key, and a lever rotating in a plane perpendicular to the travel of said wedge, and interlocking said wedges.

54. The combination in a voting machine of voting keys arranged in groups, an interlocking wedge for each key, and a lever interlocking the wedge in each group, said lever rotating in a plane perpendicular to the travel of said wedge, and being movable in said plane to lock said keys against voting operation.

55. The combination in a voting machine of a series of voting keys arranged in groups, a wedge for each key carried thereon, a lever interlocking the wedges of each group, and means for simultaneously moving predetermined ones of said lever to locking position, to lock the keys of such groups against operation.

56. The combination in a voting machine of Yes and No keys arranged in pairs, an interlocking wedge for each key and a lever interlocking the wedges of each pair, said levers being mounted upon a suitable support and being capable of movement along said support, and a locking out bar for moving certain of the levers along said support to lock their keys against voting operation.

57. The combination in a voting machine of Yes and No keys arranged in pairs, a lever for interlocking the keys of each pair, and a lock out bar having adjustable stops thereon for moving predetermined ones of said levers to locking position to lock its keys against voting operation.

58. The combination in a voting machine of Yes and No keys arranged in pairs, a sliding lever mounted upon a support for interlocking keys of each pair, and means for sliding said lever along its support to lock both the keys of each pair substantially as described.

59. The combination in a voting machine of Yes and No keys arranged in pairs, and means for interlocking the keys of each pair, said means being movable to lock both keys of its pair against voting operation.

60. The combination in a voting machine of Yes and No keys arranged in pairs, a lever for interlocking each of said pairs, a support having slots therein upon which said levers are movably mounted, and a plurality of means movable along said support for moving said interlocking levers to a position in which the keys of its pair are locked against voting operation.

61. The combination in a voting machine of Yes and No keys arranged in pairs, of levers interlocking the keys of each pair, the support for said levers, slots in said support by which said levers are capable of sliding along said support, and means for sliding said levers along said support to lock the keys of said levers against voting operation.

62. The combination in a voting machine of Yes and No keys arranged in pairs, a lever interlocking the keys of each pair, a support for said levers on which support said levers are movably mounted, and a sliding bar moving along said support, said bar being provided with removable hooks by means of which any predetermined levers may be moved from interlocking to locking position.

63. The combination in a voting machine of Yes and No keys arranged in pairs, a device for interlocking the keys of each pair, a support for said devices on which each device is pivotally and slidably supported, and means for moving said devices along said support by which they are moved from interlocking to locking position.

64. The combination in a voting machine of Yes and No keys arranged in pairs, a device for interlocking keys of each pair, a support for said devices on which said devices are pivotally and slidably mounted, and means for moving a number of said devices from interlocking to locking position, said means being provided with removable stops by which certain predetermined keys may be locked out while the rest are left free to operate.

65. The combination in a voting machine of keys arranged in groups, and a lock out device for the keys of said group, said device being movable to locking position by a cam having an active and an idle portion.

66. The combination in a voting machine of Yes and No keys arranged in pairs, and an adjustable lock out device controlling certain ones of said pairs, said lock out device being movable to locking position by a cam having an active and an idle portion.

67. The combination in a voting machine of a series of Yes and No keys arranged in pairs, a device for interlocking the keys of each pair, and means for moving said device from interlocking to locking position, said means comprising a sliding bar and a push key having a cam therein which engages with a pin on said sliding bar.

68. The combination in a voting machine of a Yes and No lock out device comprising a sliding bar having a pin thereon and a push key having a cam thereon engaging with said pin, said cam having an active and an idle portion, by means of which idle portion the lock out bar is held in its locking position.

69. The combination in a voting machine of a straight ticket rock shaft, a straight ticket lever by means of which said rock shaft is moved, and a cam movement between said straight ticket lever and the rock shaft.

70. The combination in a voting machine of a straight ticket rock shaft, and a straight ticket lever provided with a cam for operating said rock shaft, said cam operating on the rock shaft with the greatest leverage at the beginning of the movement, and the least leverage at the end of the movement.

71. The combination in a voting machine of a series of straight ticket levers, and cams therefor, said levers and cams being threaded, whereby said levers are removable from the key board when not needed.

72. The combination in a voting machine of a series of straight ticket rock shafts, and cams and levers therefor, said levers being staggered with relation to each other so that each can go to the end of its stroke without interfering with the other levers.

73. The combination in a voting machine of an arm on the end of the machine for unlocking the machine, and a door covering a portion of the key board of the machine, said door and said arm being interlocked against each other by cams so that the arm must be removed to a certain position before said portion of the key board can be uncovered for voting operation.

74. The combination in a voting machine of a rock shaft mounted on the end of the machine, an arm carried on said rock shaft by means of which said rock shaft is caused to operate mechanism to lock and unlock the voting mechanisms, and a door on the machine covering a portion of the face plate, said door and said arm being interlocked with each other by means of cams so that the said arm must be in a certain predetermined position before said portion of the key board can be exposed for voting operation.

75. The combination in a voting machine of a reciprocating frame for securing the movement of the counters, and means connecting said frame to the counter actuator of the totalizing counter through which the reciprocations of said frame are registered on the said counter.

76. In a voting machine, a free ballot depositing device movable into voted position, said device consisting of a hinged door capable of being lifted to permit the deposit of the free ballot therein, means for locking said door against being lifted or against being retracted to change a vote after said balloting device has been moved to voted position.

77. In a voting machine, a registering mechanism and a pawl for actuating it for each candidate or ticket arranged in rows or series, and an edgewise movable frame independently mounted having a series of bars one for each row or series of pawls and adapted when moved to actuate every pawl that is in position to actuate the registering mechanisms.

78. In a voting machine, a stationary frame formed of bars or plates secured together at right angles, registering mechanisms mounted thereon, independent pawls movably mounted thereon for actuating the registering mechanisms, and a frame independently mounted made of bars or plates secured together at right angles and movable edgewise in said stationary frame for actuating said pawls.

79. In a voting machine, a lever operated after voting, registering mechanisms, independent pawls to actuate the same, means for placing the pawls in position to actuate the registering mechanisms, an independently mounted frame that engages said pawls when in an actuating position, and means operated by the said lever for moving said frame in the same direction as said pawls and thereby actuating the registering mechanisms.

80. In a voting machine, registering mechanisms for all the candidates on one ticket, pawls which are not normally in position to directly actuate such registering mechanisms, a common means for placing the pawls in position to actuate the corresponding registering mechanisms, and a different common means for actuating said pawls after being so placed.

81. In a voting machine, registering mechanisms, independent pawls to actuate the same, means independently mounted and movable in the same direction as said pawls to cause said pawls to actuate the registering mechanisms, and means for preventing the actuation of some of said registering mechanisms.

82. In a voting machine, registering mechanisms, independent pawls not in position to actuate said registering mechanisms, means for placing the pawls in position to actuate the registers, a common means independently mounted to actuate said pawls when in an actuating position and movable in the same direction, and means for preventing the actuation of some of said registering mechanisms.

83. In a voting machine, the combination of independent locking mechanisms, registering mechanisms, including counters and actuators, arranged in rows, reciprocating means provided with devices separately engaging the rows of actuators, for actuating the registers, returning the locking mechanism to normal and holding the parts of the machine against further operation, and mechanism for moving said means in the opposite direction to set the machine for voting.

84. In a voting machine, registering mechanisms for all the candidates on one ticket, voting devices, toothed members having a motion independent of said voting devices, said members not normally in position to directly actuate said registering mechanism, but adapted to be moved by a voter in the act of voting into such position, a common means for placing said members in position to directly actuate the corresponding registering mechanisms, and a different common means longitudinally movable for actuating the members so placed to register the votes indicated.

85. In a voting machine, registers, mechanisms to be operated by the voter in voting, and trains of mechanisms between said registers and said mechanisms including devices having a motion or motions different from said voter operating devices and normally breaking or interrupting said trains of mechanisms but capable of completing said trains, longitudinally movable mechanism for operating said trains of mechanisms and the registers, and a common means for placing said devices in positions to actuate the registers.

86. In a voting machine, a plurality of registers, a plurality of actuating pawls one for each register, and movable into and out of set position to actuate said registers, and an edgewise movable frame adapted when actuated to cause selected pawls when set to actuate selected registers.

87. A voting machine comprising a plurality of series of registers arranged in vertical columns and horizontal rows, a correspondingly arranged plurality of series of vote selecting indicators, relatively fixed supports for each of said plurality of series, a skeleton frame movable edgewise independently of said supports and having vertical bars corresponding to said vertical columns of registers and indicators and operative when moved to actuate selected registers, and suitable interlocking mechanism for said indicators.

88. A voting machine comprising a plurality of series of registers arranged in transverse office and party rows, a correspondingly arranged plurality of series of vote selecting indicators, one indicator for each register, relatively fixed supports for each of said plurality of series of registers and indicators, a skeleton frame movable edgewise independently of said supports and having bars corresponding to one series of said rows and operative when moved to actuate said registers, and suitable interlocking mechanism for said indicators.

In testimony whereof, I affix my signature, in presence of two witnesses.

ANGUS McKENZIE.

Witnesses:
E. H. ELLISON,
FRANK KEIPER.

---

Copies of this patent may be obtained for five cents each, by addressing the "Commissioner of Patents, Washington, D. C."